United States Patent [19]
Geisler et al.

[11] Patent Number: 5,523,066
[45] Date of Patent: Jun. 4, 1996

[54] TREATMENT OF LEAD SULPHIDE BEARING MINERALS

[75] Inventors: Robert A. Geisler, North York; Ira E. Puddington, Ottawa, both of Canada

[73] Assignee: Centaur Mining Exploration Limited, North York, Canada

[21] Appl. No.: 417,687

[22] Filed: Apr. 6, 1995

Related U.S. Application Data

[63] Continuation-in-part of Ser. No. 255,989, Jun. 8, 1994, abandoned.

[51] Int. Cl.⁶ .......................... C01G 21/00; C22B 13/00; E21C 41/00; E21B 43/28
[52] U.S. Cl. ..................... 423/98; 299/5; 75/712
[58] Field of Search .................. 423/98; 299/5; 75/712, 743, 770

[56] References Cited

U.S. PATENT DOCUMENTS

| | | | |
|---|---|---|---|
| 509,058 | 11/1893 | Waller et al. | 423/98 |
| 3,196,001 | 7/1965 | Marvin | 423/98 |
| 3,933,973 | 1/1976 | Evans et al. | 423/98 |
| 3,959,436 | 5/1976 | Watts | 423/98 |
| 4,381,873 | 5/1983 | Johnson et al. | 299/5 |
| 4,410,496 | 10/1983 | Smyres et al. | 423/98 |
| 4,427,235 | 1/1984 | Hartman | 299/5 |
| 4,526,615 | 7/1985 | Johnson | 299/5 |
| 4,756,887 | 7/1988 | Lesty et al. | 299/5 |

FOREIGN PATENT DOCUMENTS 1444377  12/1988  U.S.S.R. .................... 423/98

*Primary Examiner*—Steven Bos

[57] ABSTRACT

A process is described for solubilizing lead contained in ores mineralized with sulphidic minerals by in-situ leaching with an acetic acid and acetate containing solution in presence of an oxidant. The in-situ leaching is conducted by means of drillholes in the ore body. In another embodiment the acetic acid and acetate containing solution is percolated through a bed of crushed untreated rock or unconsolidated mineral particles, mill tailings and/or agglomerated or unagglomerated sulphidic lead containing waste material, forming a pile or a layer in an open vat, in presence of an oxidant. Lead is recovered from the pregnant lead acetate containing solution and the solution may subsequently be recycled to further leaching of lead sulphidic minerals or lead sulphide containing particles.

23 Claims, 1 Drawing Sheet

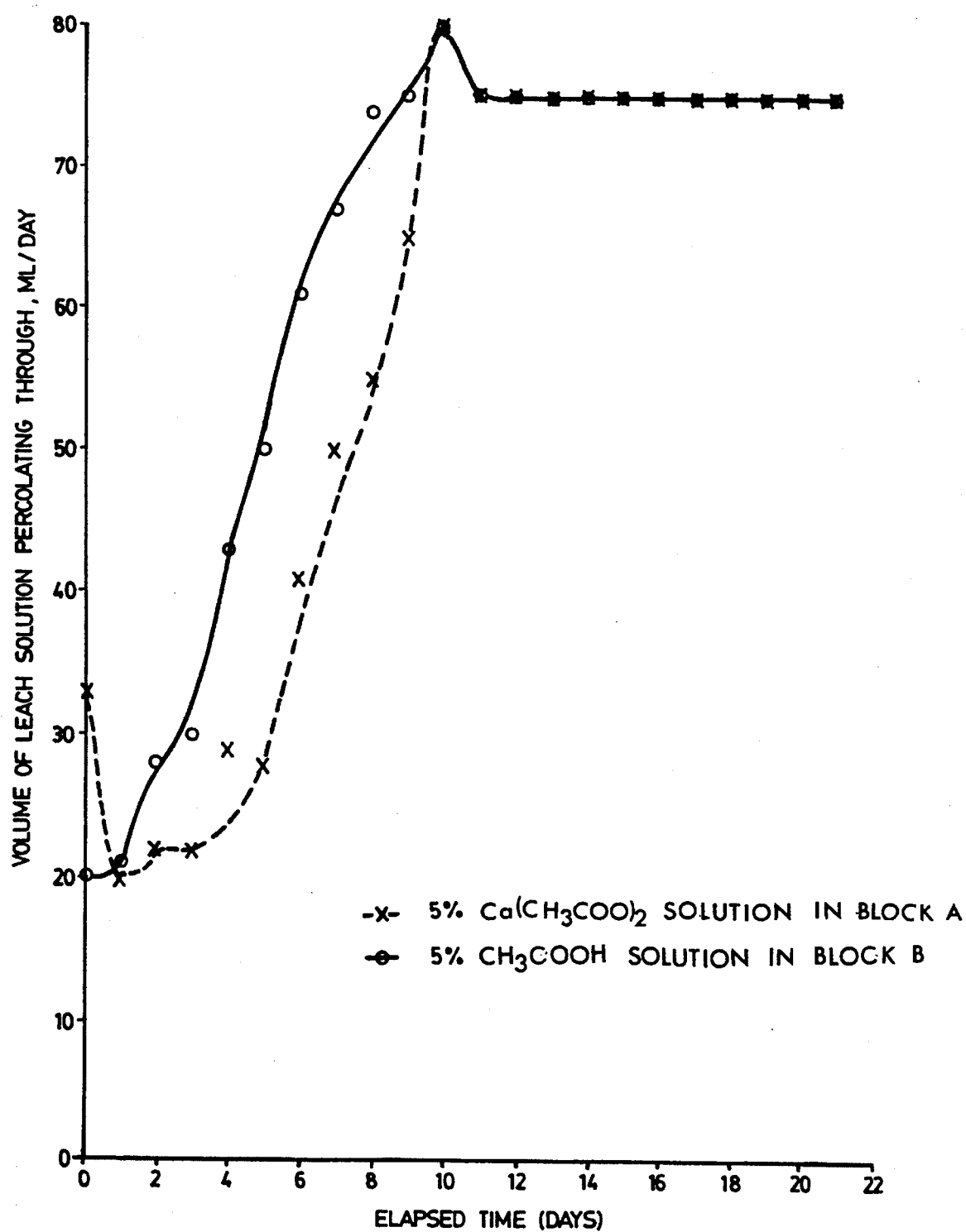

TREATMENT OF LEAD SULPHIDE BEARING MINERALS

This application is a continuation-in-part application of our application U.S. Ser. No.: 08/255,989, filed Jun. 8, 1994, now abandoned.

FIELD OF THE INVENTION

This invention relates to hydrometallurgical treatment of sulphidic minerals, more particularly to solubilizing lead values in lead bearing sulphidic minerals by in-situ leaching of consolidated or unconsolidated mineral deposits.

BACKGROUND OF THE INVENTION

There are known pyrometallurgical methods for recovering lead values from lead sulphides, however, such treatment may entail expensive mining and beneficiation process steps to concentrate the sulphides and in addition it may create environmental problems, including the generation of sulphurous gases, lead bearing fumes, acid drainage and substantial land disturbance. On the other hand, hydrometallurgical treatment of lead sulphides with conventional mineral acids for lead recovery, may require several expensive process steps to overcome the low aqueous solubility of the resulting lead chloride or lead sulphate.

In-situ leaching has several economic advantages over conventional leaching which usually has to be performed in containers having costly corrosion resistant lining, or in expensive pressure vessels and similar equipment. The initial cost of in-situ leaching is relatively low, requiring only the rendering of the ore body accessible to a leach solution by conventional methods, such as providing passages to the ore body and/or allowing the leach solution to penetrate the bedrock by naturally occurring fissures and pores. The prepared passages, naturally occuring fissures and pores act as a manifold to distribute the leachant through the ore body and bring the leachant in contact with the value mineral, in the present instance, with the sulphides. The leachant is subsequently either circulated through the ore body by means of pumping or left in stationary contact for an appropriate period of time to solubilize the value metal. The resulting pregnant solution is then withdrawn for treatment in further recovery process steps. There are, however, very important aspects that need to be considered when a value metal recovery process by in-situ leaching is devised:

i) the formation of water-insoluble compounds of the metal to be recovered cannot be tolerated, since such insoluble compounds would form a coating on the mineral within the value metal ore deposit in the bedrock, thus rendering the ore inaccessible to further solubilization from the ore body;

ii) the formation of an insoluble by-product of the leach reagent and the gangue minerals or other constituents of the bedrock, is to be avoided, since such insoluble by-product can easily lead to blocking of pores and fissures, thus effectively terminating the in-situ leaching process;

iii) yet another aspect that requires serious consideration regarding the practice of in-situ leaching, is that the reagent used in the solubilization of the value metal be harmless to the environment, and that termination of the in-situ leaching process, be that temporary or otherwise, can be accomplished without creating any toxic compound.

U.S. Pat. No. 4,381,873 issued to Johnson et al. on May 3, 1983, describes a solution mining process for copper-iron sulphidic ores wherein the ore body is conventionally fractured, then roasted in-situ and subsequently leached with a sulphuric acid solution provided by means of water addition to the roasted ore in-situ and/or supplemented with a mineral acid. U.S. Pat. No. 4,381,873, however, is a process which could not be readily adapted to in-situ leaching of lead sulphidic minerals, as it would lead to insoluble lead sulphate coating formation in-situ, thus impeding the progress of the leaching reaction; moreover, the process would also result in insoluble calcium sulphate formation as a by-product, thus blocking naturally occurring pores and fissures, or the pores created by roasting. In addition, U.S. Pat. No. 4,381,873 would generate sulphur dioxide and harmful acidic ground water, both being considered environmentally highly undesirable.

There are conventional processes for solubilizing, purifying and refining lead in oxidic lead compounds which utilize solutions containing acetate ions, however, the problems inherent in the refining of oxidic lead compounds are quite different from those of recovering lead from mineral substances containing lead sulphides.

The conventional hydrometallurgical method for recovering value metals from their sulphides is to leach the sulphidic concentrate with a mineral acid, such as sulphuric or hydrochloric acid, or with an acidic solution of ferric chloride or sulphate, or with an acidic solution of copper sulphate or chloride, frequently assisted by an oxidizing agent. The leaching step is commonly conducted in a corrosion resistant container or an autoclave. The role of the oxidizing agent is to oxidize the sulphide ions in the sulphidic concentrate to sulphite or sulphate, thereby enhancing the leaching power of the leach liquor. Such a process is described, for example, in U.S. Pat. No. 3,959,436 issued to J. C. Watts on May 25, 1976. Most conventional leach processes utilizing mineral acids or solutions of sulphates or chlorides cannot be adapted to lead sulphide solubilization in a commercialy rewarding manner due to the low aqueous solubility of the resulting lead chloride and lead sulphate.

U.S. Pat. No. 3,933,973 issued to Evans et al. on Jan. 20, 1976, describes the treatment of finely ground lead sulphide containing mineral concentrates with an acetic acid-ammonium acetate solution in an autoclave at temperatures above 60° C., in the presence of oxygen gas at 20–60 psi pressure. It is noted, that Evans et al. teach that below the above stated temperatures and pressures the oxidation reaction does not occur at practical rates. The object of the process of Evans et al. is to recover lead from a slurry of lead sulphide bearing concentrate of particle size smaller than 325 mesh and pulp density of less than 50 wt. %, by leaching the slurry in an expensive pressure resistant vessel. The source of the lead sulphide bearing concentrate is usually a lead sulphide containing ore which is first mined, then crushed, ground and subjected to costly mineral separation process steps to substantially remove the gangue minerals and other metal sulphidic minerals. In other words, the lead ore which is to be treated in the Evans et al. process needs to be of fairly high grade to render the process commercially rewarding.

It is further noted, that although the stated objective of Evans et al. is to stop the oxidation of sulphide at the elemental sulphur state, a considerable portion of the sulphur is oxidized to sulphate, thereby producing insoluble lead sulphate which is precipitated as fine particles in the course of the leaching process step with acetic acid-ammonium acetate solution. The lead sulphate by-product is removed from the slurry by subsequent process steps, such as treatment of the separated lead sulphate containing residue with ammonia in an autoclave. It is also to be noted that the process of U.S. Pat. No. 3,933,973 utilizes ammonium acetate in the pressure leaching step, and ammonia and similar ammonia based reagents in subsequent process steps; that is, ammonium ions appear to be the linchpin of the process steps of Evans et al. The use of no other metal acetate solution is suggested by Evans et al. Any gypsum, that is calcium sulphate, which may be precipitated as a consequence of oxidation of sulphides to sulphate can be eliminated in the liquid-solid separation step of the Evans et al. process.

Another aspect to be considered is that conventional recovery of lead from its ores, be it by a known pyrometallurgical processes or by a hydrometallurgical process such as described in U.S. Pat. No. 3,933,973, usually necessitates that the ore be brought to the surface by a mining operation often conducted at substantial depth below ground level, requiring costly equipment. The mined ore has to be crushed, ground, then usually subjected to beneficiation involving several mineral separation process steps, before it may be treated by conventional extractive processes. Observance of environmental regulations governing mining operations may further increase the cost of recovering lead from its ores by conventional processes.

There is a need for a hydrometallurgical method to recover lead values by in-situ solution mining of consolidated bedrock, or leaching lean sulphidic ores and tailings, more particularly grade lead sulphide ores, in unconsolidated minerals by the use of relatively inexpensive and environmentally acceptable reagents, without the application of expensive surface or underground mining process steps and costly leaching equipment.

Moreover, it is of importance that the lead be recovered from lead sulphidic ores in the absence of steps creating adverse environmental impact.

SUMMARY OF THE INVENTION

A new method has now been found for the solubilization of lead in lead sulphidic minerals by means of in-situ leaching. The lead sulphides in the ore body are treated with a solution containing acetic acid and acetates of alkali metals and alkaline earth metals, having pH between 3.5 and 7, at ambient temperature and pressure. The acetate solution is brought in contact by means of passages provided in the ore body, and by utilization of naturally occurring fissures and pores, with the lead sulphidic minerals in the ore body, in the presence of oxidants which oxidize the sulphide in the ore to elemental sulphur and substantially avoid hexavalent sulphur formation. Contact with the acetate solution and the ore body is maintained until substantial solubilization of the lead sulphide therein takes place. The lead acetate solution so obtained is subsequently removed from the ore body and is treated for lead recovery by known methods.

In another embodiment of the invention lead sulphide containing unconsolidated minerals, including discrete blocks of rocks and agglomerated ore particles and concentrate, agglomerated and unagglomerated lead sulphide bearing mill tailings of mineral beneficiation and similar lead sulphide containing by-products and waste products of recycling processes, are leached in a vat or pile, at ambient temperature and pressure, with a solution containing acetic acid and acetates of alkali metals and alkaline earth metals, having pH between 3.5 and 7, and in the presence of oxidants which oxidize the sulphide in the lead sulphide to elemental sulphur and substantially avoid hexavalent sulphur formation. The pregnant leach solution is subsequently removed from the vat or pile and is treated for lead recovery by known methods.

BRIEF DESCRIPTION OF THE DRAWINGS

FIG. 1 is a plot showing the flow rate of leach solution penetrating a sulphidic lead ore block.

The best mode of the preferred embodiments of the invention will now be described and illustrated by working examples.

DESCRIPTION OF THE PREFERRED EMBODIMENTS

In a process for recovering value metals from an ore body it is customary to establish the size, depth and shape of the ore body and estimate the concentration range of the value metals in the ore body. It is beyond the scope of the present discussion to consider the manner in which the economic viability of mining a given ore body may be assessed.

For the sake of clarity, an ore body is usually an underground or surface rock formation which is notably richer in the minerals under consideration, in the present case sulphidic minerals, than the bedrock in which the ore body is located. An ore body may also be referred to as a consolidated bedrock containing value metals. The ore body may consist of masses, veins or seams of minerals within the bedrock or the minerals may be disseminated in the main constituents of the bedrock. The value metal minerals are usually accompanied by silicates, limestone and other gangue compositions depending on the geological history of the ore body.

In-situ leaching of sulphidic ores is utilized relatively infrequently due to the fact that most value metal ores and constituents of bedrock respond usually only to mineral acids, such as hydrochloric acid, sulphuric acid and nitric acid, which are considered highly damaging to the environment. Hence, as discussed hereinabove, most sulphidic ores are conventionally mined, then concentrated and the desired metal is recovered from the obtained concentrate by leaching and/or pyrometallurgical process steps. Although mining and mineral separation process steps are costly to operate, overcoming the environmental damage resulting from utilizing mineral acids in solution mining may be even more expensive.

It has now been found that lead contained in lead sulphidic minerals in the ore body or in a form that has not been subjected to expensive mineral separation process steps, can be solubilized by an acetic acid-alkali metal and/or alkaline earth metal containing leach solution. In one of the preferred embodiments of the present invention the sulphide bearing minerals located in the ore body are brought into contact in-situ with an acetic acid-alkali metal and/or—alkaline earth metal acetate containing leach solution. Such a process is known as in-situ leaching. The leach solution is allowed to react with the sulphidic minerals in the ore body for a sufficient length of time to attain a value metal concentration to render the in-situ leaching process economical. The pregnant solution is subsequently returned to ground surface and the dissolved value metals, in particular solubilized lead, are recovered from the leach solution by convenient methods. It is of great importance that the reagents utilized in the in-situ leaching process be non-toxic and are not likely to damage the environment.

In the present process for solubilizing lead from lead sulphide bearing minerals in an ore body a solution containing acetic acid and acetates of alkali metals and/or alkaline earth metals used. The lead is solubilized as lead acetate. Acetic acid may be produced by natural processes and is considered to be biodegradable and environmentally friendly. Acetates of alkali metals and alkaline earth metals are also considered to be non-toxic. Pure acetic acid may be used, but the preferred solution contains acetic acid and acetate ions having pH values between 3.5 and 7, more preferably between 4 and 6.5. The solution strength may be as high as 100 wt. % or vol. % acetic acid or as low as a few percent, but the preferred solution concentration ranges between 5 and 40 wt. %. The acetate is present as an alkali metal or alkaline earth metal acetate. The use of ammonium acetate is to be avoided due to ammonium ion having been found to encourage the formation of environmentally undesirable bacteria. The cation forming the acetate may be added in the leach solution, or may be the result of the reaction between the acetic acid in the leach solution and alkali and/or alkaline earth metal components of the ore body, such as for example, limestone. It is to be noted that the pH of the leach solution is expected to change during the residence of the solution in the ore body.

The present process is conducted at ambient temperature, that is at the temperature of the surrounding bedrock which is usually between 0° C. and 28° C. In other words, no attempt is made to increase the leach temperature above the temperature of its surroundings. The present process is conducted at ambient pressure, understood to mean atmospheric pressure.

Lead sulphides may be finely disseminated in other oxidic and sulphidic minerals or may form larger crystal aggregates. In any case, lead sulphide is usually accompanied by other metal oxides and sulphides, such as for example compounds of tin, copper, manganese, iron, cobalt, nickel, titanium and other non-ferrous metals. The ore body often contains in varying amounts, gold, silver and platinum group metals. Platinum group metals are understood here to include platinum, rhodium, rhenium, iridium, palladium and similar metals commonly considered to be a platinum group metal. Furthermore, the ore body may contain rare earth metals such as cerium, yttrium and members of the lanthanum group. All of the above considered metals may also be solubilized by the acetate solution. It is noted that although the present process is designed to recover lead from lead sulphidic minerals, many other value metals which are present in the ore body accompanying the lead sulphide, may also be recovered by the present in-situ leaching process.

The recovery of metals from their sulphides by hydrometallurgical methods usually necessitates the oxidation of the sulphide ion in the metal sulphide to render the metal soluble, and hence recoverable from the solution. In the process of recovering lead from lead sulphidic minerals, it is of importance to arrest the oxidation of the sulphide ion before it reaches the sulphate state so that insoluble lead sulphate formation is avoided. Although it is known that lead sulphate may be dissolved by an acetate solution under certain circumstances, the dissolution rate is likely to be too slow for the process to be commercially exploitable. For best results it is preferred that the sulphide in the sulphidic lead minerals is oxidized only to elemental sulphur, hence the oxidation potential of the oxidant in the leach solution is adjusted such that it is insufficient to oxidize the sulphide to the hexavalent state. The oxidation potential of a reagent is understood to mean the power of the reagent to remove electrons and it maybe expressed quantitatively in millivolts. In the present process for leaching lead from lead sulphidic minerals by an acidic acetate solution, the solution preferably contains a relatively mild oxidant, such as oxygen dissolved in the solution, or low and controlled concentration of water-soluble oxidizing agents including but not limited to, permanganates, hydrogen peroxide and other water-soluble peroxides or water-soluble perchlorates. Ozone in low concentration may also be used as oxidizing agent, however, this is likely to render the process more expensive to operate. One convenient method for the dissolution of oxygen in the solution may be to saturate the leach solution with air and subsequently circulate the leach solution in the passages of the ore body. The oxygen may be supplemented by means of pump-injection of air through the drillholes at ambient pressure, or applying suction at the exit end of the drilled passages thus allowing air bubbles to travel through the leach solution. A particularly suitable method of providing oxidant in the present leach process was found to be the introduction of air, preferably moist air, in the bedrock through the drilled passages and naturally occuring fissures, may be in the form of compressed air, prior to injecting the leach solution into the drilled passages.

It has been surprisingly found that the presence of variable valency metals in the leach solution, such as copper, manganese, iron, titanium and similar transition metals, may enhance the oxidation of sulphide to elemental sulphur only and thereby the solubilization of lead as lead acetate. The appropriate variable valency metal may also be present in the ore body as one of the other metal compounds solubilized by the leach solution, or it may be added with the acetate leach solution.

It is known that in the course of solubilization of the value metal, oxidation of the sulphur contained in a sulphidic mineral usually takes place in stages:

$$S^{2-} \text{(in the sulphide)} = S^0 + 2e \quad (1)$$

$$S^0 + 1 1/2 O_2 = SO_3^{2-} + 4e \quad (2)$$

$$SO_3^{2-} + 1/2 O_2 = SO_4^{2-} + 2e \quad (3)$$

As discussed above, it is preferred that in the solubilization of lead sulphide the oxidation is arrested at stage (1). In conventional processes at least a portion of the elemental sulphur formed is oxidized to hexavalent sulphur, resulting in insoluble lead sulphate formation. It has been found that in the present process for in-situ leaching of lead sulphide minerals with an acetic acid and alkali metal and/or alkaline earth metal acetate containing solution, there was no evidence of oxidation to the hexavalent sulphur stage; there was no sulphate ion in measurable amounts, nor was lead sulphate found in the obtained lead acetate containing leach liquor. Elemental sulphur, on the other hand, was notably present in the obtained leach liquor.

The following reasons are proposed as explanation for the absence of oxidation of sulphur to the hexavalent state in the present acetate leaching process, without being bound by them. The rate of oxidation to elemental sulphur by reaction (1) may take place at the lower leaching temperature of the present process at a faster rate than the oxidation to sulphate (2 and 3). In conventional processes more aggressive oxidation and higher temperatures are applied, encouraging faster oxidation to sulphate. The elemental sulphur formed in reaction (1) may nucleate as sulphur particles at lower temperatures more readily than when the reaction takes place at higher temperatures and higher pressures in an autoclave equipped with mechanical stirring, under conditions which are likely to keep the formed elemental sulphur in a colloidal solution, thereby rendering it more amenable to further oxidation. It is known that small sulphur particles (flour of sulphur) are relatively inert at room temperature. Moreover, the large surface area provided by the pores and fissures within the ore body may serve as active sites for elemental sulphur nucleation, in contrast to continuous agitation of the leach solution taking place within a conventional autoclave. The above effects may act in combination or one may predominate, leading to substantially arresting the oxidation of the sulphide at the elemental sulphur stage in the present in-situ leaching process.

In the best mode of practising the invention, holes or passages are drilled down from ground surface or introduced by other means, such as for example hydrofracking, to the ore body. Such passages will be referred to in the discussion hereinbelow as drillholes. The acetate ion containing solution is injected into the ore body for in-situ leaching through the drillholes. The diameter of the drillhole may range from a fraction of an inch to several inches and is dictated by convenience only. The geometric shape of the cross-section of the drillhole is of little significance. The drillhole may be vertical or it may enclose an angle with the vertical. The drillholes may be interconnected or not, as long as they conduct the leach solution to the ore body. The drillholes may become interconnected as a consequence of the leach solution penetrating the drillhole walls through naturally occurring fissures and pores, and by creating channels in dissolving rock components. The present in-situ leach process it utilizes naturally occurring fissures and natural porosity of the bedrock. It is believed that the walls of the fissures and pores serve as reaction surfaces and sites for the leach reaction steps taking place. Such surfaces are not available when sulphide concentrates of fine size are leached.

It is a particular advantage of the present process that it can solubilize sulphidic minerals, in particular lead sulphidic minerals, disseminated in any alkaline earth metal containing bedrock. The in-situ leach process is particularly suited for leaching sulphidic minerals disseminated in sandstone. The sandstone forms a dendritic pattern which may act as a manifold to access the sulphidic minerals. The acetic acid containing leach solution reacts with the calcium and other alkaline earth metal compounds contained in the interstices of the sandstone, thus creating pores and conduits which can distribute and bring the acetate containing leach solution in contact with the sulphidic minerals disseminated in the sandstone. It is also believed, that the created conduits may act as adsorbent surfaces for the oxygen in the oxidant and thereby assist in the oxidation of sulphide to elemental sulphur. It is noted, however, that the practice of the present process is not restricted to lead sulphide disseminated in bedrock composed of sandstone.

The pregnant solution may be withdrawn through the original entry opening or there may be a separate passage for withdrawing the obtained pregnant leach solution.

The leach solution is conveniently an acetic acid and calcium acetate solution, but other alkali metal and alkaline earth metal acetates may also be present. The initial composition of the leach solution is often predominantly acetic acid, but subsequent to being injected into the ore body, the acidic leach solution reacts with the calcium, magnesium, barium, sodium, potassium and such like present in the bedrock gangue minerals, thereby providing a solution containing acetic acid and acetates of alkali metals and alkaline earth metals. It is to be noted, that the presence of sulphate ions in the solution in notable amounts is detrimental, as it leads to insoluble calcium sulphate formation which is likely to block pores and reduce the rate of solution penetration, and hence the efficiency of the in-situ leaching process.

In fact, one of the unexpected advantages of the present process is that the acetate ions are provided by the reaction of the leach liquor with the alkali metals and alkaline earth metals contained in the surrounding bedrock, thereby substantially reducing reagent costs, and simultaneously creating pores and capillary passages in the ore body thus enhancing penetration of the leach liquor and rendering the lead sulphide and other sulphides present accessible to leaching. Moreover, the reaction of the acetic acid with the bedrock and the gangue minerals is beneficial in stabilizing the pH of the leach liquor around 5–6.

The residence time of the leach solution in the drillholes and the surrounding ore body depends on the nature of the ore body, the concentration and accessibility of the lead sulphide minerals in the ore body, compounds of other metals present in the ore body, and similar parameters influencing the rate of dissolution of lead in the ore body. The pregnant leach solution may be withdrawn, and may be recycled to the ore body with or without compositional adjustments, in the usual manner. The number of cycles are dictated by convenience only. It is, however, usual to remove the solubilized metal from the pregnant leach solution before the leach solution is recycled.

When the lead acetate content of the leach solution has been maximized under the given circumstances, the solution is withdrawn and treated for lead recovery by conventional and known processes. The leach solution depleted of dissolved lead acetate is usually recycled to the ore body after some compositional adjustments, such as adding acetic acid and oxidant, for utilization in further leaching. The acetate ion concentration in the leach solution may be replenished by the reaction of the fresh acetic acid with the alkali metals and alkaline earth metals in the bedrock gangue minerals.

As mentioned above, other metals present in the ore body and leached by in-situ leaching, may also conveniently be recovered from the obtained pregnant leach solution.

Another preferred embodiment of the present invention is leaching of lead sulphide containing substances in unconsolidated minerals. Such leaching is sometimes referred to as heap leaching. Heap leaching is understood to mean the leaching of discrete pieces of mineralized rock and particles in a form of a pile. The particles are usually smaller than 325 Tyler mesh and may be agglomerated or unagglomerated. The discrete blocks of rock, agglomerated or unagglomerated larger particles may be leached piled up in conventional layers of appropriate depths. The leaching of discrete blocks of rock, unconsolidated mineral particles or agglomerated particles containing lead sulphides, may also be conducted in an open vat or container in a conventional manner. The unconsolidated mineral particles and agglomerated particles either in a pile or contained in a vat, are injected with a leach solution and the solution is allowed to percolate through the pile without substantially destroying the integrity of the discrete particles and blocks or agglomerates. In the present case the blocks may be pieces of lead sulphide containing rock which may be a by-product of an other process. The unconsolidated mineral particles or agglomerates may be lead sulphide containing tailings. The agglomerates are obtained by known methods utilizing usual additives which do not react with the leach solution in a detrimental way. Alternatively, the agglomerating agent may additionally contain a water-soluble acetate for enhancing the porosity of the agglomerates and to replenish the leach solution. Lead sulphide containing waste products originating in other processes may also be agglomerated if need be, and subsequently leached in a vat or pile to recover lead therein. The lead sulphide containing discrete pieces and blocks of rock, which may be as large as a foot diameter but are preferably of size several inches or smaller, or agglomerates are conveniently leached in an uncontained pile, or in a vat or open container, in any convenient depth.

For the sake of clarity, any container for conducting open leaching in accordance with the present invention will be referred to as a vat.

Leaching in a pile or bed as discussed above, is conducted with a solution containing acetic acid and acetates of alkali metals and alkaline earth metals described hereinabove, having a preferred concentration of 5 to 40 wt. % and pH between 3.5 and 7, but preferably between 4 and 6.5. Moreover, the leaching is to be conducted in the presence of a relatively mild oxidizing agent, which may be oxygen or a water-soluble oxidant added with the leach solution, such as a permanganate, a water-soluble peroxide or a water-soluble perchlorate. More conveniently air, preferably moist air, is blown or bubbled through the pile or heap at regular intervals. As briefly mentioned above, the presence of a variable valency metal in the leach solution, either added in the leach solution or as additionally leached during the leaching step, has been found to further enhance the leaching rate of the lead sulphides.

As discussed hereinabove, for best results the solution containing acetic acid and acetates of alkali metals and alkaline earth metals for leaching lead sulphide containing discrete blocks and particles of ore, agglomerated or unagglomerated lead sulphide containing tailings, lead sulphide containing waste materials and similar lead sulphide containing substances, in a pile or in a vat open to the atmosphere, in the presence of an oxidant, is to be conducted without oxidizing the sulphur in the lead sulphide to the hexavalent state. In other words, the oxidation potential of the oxidant in the leach solution is such that the sulphide oxidation is arrested at the elemental sulphur stage and the precipitation of insoluble lead sulphate is avoided.

Acidic acetate leaching of lead sulphidic minerals in accordance with the present invention either as in-situ leaching of an ore body, or as leaching of unconsolidated particles, is conducted at ambient temperature and pressure.

The effectiveness of the process for solubilizing lead comprised in lead sulphidic minerals by in-situ leaching or pile leaching will be better understood by those skilled in the art by having regard to the following examples, which illustrate the working of the process of the present invention.

EXAMPLE 1

A block of sandstone weighing 200 grams was placed in a beaker and was covered with 300 ml of solution containing 10 wt. % calcium acetate. The sandstone was originally found to contain 7.7 wt. % lead as lead sulphide. To ensure stirring and adequate oxygen supply, air was bubbled through the soaking solution at a low rate. The soaking of the sandstone block was continued for seven days, after which period the obtained solution was evaporated to dryness and the residue analyzed. The residue was found to be predominantly lead acetate. Calcium acetate was also present in the residue, accompanied by low amounts of manganese, iron and magnesium acetate, and elemental sulphur as flour of sulphur. It was estimated that the amount of lead leached represented about 25% recovery rate in a single cycle.

This experiment shows in a qualitative manner that lead may be recovered in a single step of simulated leaching of lead sulphide containing mineral particles. The recovery rate in this instance was low since the leach solution was in contact with only the surface of the sandstone block and areas of immediate proximity to the surface, and hence leaching was driven by relatively slow rate of diffusion. However, the recovery by solubilization of the lead present is clearly demonstrated.

EXAMPLE 2

Two discrete blocks of sandstone, designated A and B, having lead sulphide content as described in Example 1, were leached and the rate of penetration of the leach solution determined. Sandstone A weighed 320 g and sandstone B weighed 830 g and each was found to contain about 0.2 wt. % calcium in constituent compounds of the sandstone. Holes of 0.5 inch diameter were drilled to the centre of each of block A and block B, in the direction right angles to the bedding plane of each block. A 4 foot length of glass tube was secured to each hole with epoxy resin cement. Compressed air was introduced into each tube and the air pressure was maintained for 20 minutes. Subsequently the tube attached to block B was filled and kept full of 5 wt. % acetic acid solution; and the tube attached to block A was filled and kept full of 10 wt. % calcium acetate solution. The leaching was conducted at room temperature. After 1 day, leach solution was observed to exude from each block at about 20 ml/day. The flow rate of the leach solution by penetration of the blocks of sandstone increased gradually and by the 10th day the penetration flow rate of each block was found to be about 80 ml/day. The flow rate receded subsequently to a continuous rate of about 75 ml/day. The leach solution flow penetration can be seen plotted against time on FIG. 1.

FIG. 1 shows that the initial penetration flow rate was slower when the leach solution contained only undissociated acetic acid, however, once the acetate concentration has increased through reaction with the components of the sandstone, the penetration flow rate was influenced by the composition of the sandstone only, which was essentially similar for each block tested.

The above test lends further support to the feature that the present invention is directed to solubilizing lead sulphidic minerals as lead acetate without oxidizing the sulphide to sulphate. Any sulphate formed would precipitate out as lead sulphate and calcium sulphate. Both these compounds are highly insoluble, and thus their hypothetical formation would be manifested by blocking the pores created in the sandstone and leading to a noticeable drop in the penetration flowrate. As observed the penetration flowrate attained a steady value without substantial decrease indicating pore closure.

EXAMPLE 3

1 gram of lead sulphide containing concentrate having 325 Tyler mesh particle size, was placed in each of two beakers forming layers of 2–3 mm thickness. The concentrate layer in one beaker was covered with 30 ml solution containing 50 wt. % acetic acid and about 0.5 grams of sodium acetate added as sodium hydroxide in preparing the solution. The concentrate layer in the other beaker was covered with 30 ml of solution containing 50 wt. % of acetic acid and calcium acetate in an amount corresponding to the sodium acetate in the first solution. The beakers with the solution were allowed to stand undisturbed for 5 days at room temperature of 23° C., then the resulting solutions in each beaker were qualitatively tested and were found to contain only traces of lead. 5 ml of 10 wt. % hydrogen peroxide were subsequently added to each beaker and the beakers were allowed to stand for further 3 days. The lead sulphide concentrate in each beaker was substantially completely dissolved by the respective acetic acid-acetate solution, leaving only small amounts of white residue at the bottom of each beaker. The solutions were decanted from the residue in the beakers and were then tested again for lead and sulphate. In each case high concentration of lead was found but no indication of sulphate could be observed. The white residue in each beaker was separated, dried and ignited. The residue on ignition gave very pungent smell of sulphur dioxide, indicating that the white residue in the solution consisted predominantly of elemental sulphur. The non-conbustible portion of the white residue was found to be silicate.

The above tests clearly show that the leaching of lead in lead sulphide concentrate with a leach solution containing acetic acid and acetates of alkali and alkaline earth metals is effective only in the presence of an oxidant. Furthermore, it was also demonstrated that the sulphide in the ore is oxidized only to the elemental sulphur state.

EXAMPLE 4

A solution containing 10 wt. % acetic acid was prepared in which oxygen was dissolved by injecting air into the solution for 10 minutes. 1 gram batches of lead sulphide concentrate similar to that utilized in Example 3, was placed as a layer in each of three beakers. 1 gram of iron filings were mixed in with the concentrate in one beaker and 1 gram of manganese dioxide was mixed in with the concentrate in the second beaker. The layer of concentrate in each one of the three beakers was then covered with 75 ml of the above prepared aerated acetic acid solution. The beakers were then allowed to stand undisturbed for 7 days at room temperature. The decanted solutions from each beaker were subsequently tested semi-qualitatively for lead. It was found that lead was dissolved at a substantially higher concentration in the presence of a variable valency metal and oxygen, than when merely dissolved oxygen was acting as oxidant.

EXAMPLE 5

A drillhole of 6 inches diameter was installed vertically to a depth of 185 ft. in a sandstone bedrock, a portion of which was mineralized with galena and to a lesser extent with other metal sulphides. A 6.3 ft. section of the drillhole between 163.5 and 169.8 ft depth, which was analyzed and found to contain 2.5 wt. % lead, was sequestered off by known means. About 900 liters of a leach solution containing 27 wt. % acetic acid and 2.13 wt. % hydrogen peroxide was pump-injected into the sequestered section of the drillhole. The underground temperature of the sandstone rock was found to be 8° C. Subsequent to a residence time of 166 minutes in the mineralized section of the drillhole the aqueous leach solution was withdrawn, and a sample analyzed which was found to contain 6 wt. % of free acetic acid and the following elements of significance, predominantly in the form of acetate:

| Element | ppm | Element | ppm |
|---------|-----|---------|-----|
| Mg | 1635 | Fe | 2632 |
| Ca | 18,800 | Cu | 7.6 |
| K | 44 | Pb | 29,106 |
| Al | 313 | Zn | 2548 |
| Sr | 161 | Cd | 94 |
| $S°$ | ~20 | $SO_4^-$ | <0.1 |

The leach solution was then returned to the sequestered drillhole portion without replenishment of any of the reagents. The leach solution without additional oxidant present was allowed to stay in the sequestered drillhole for another 17 hours, then withdrawn and analyzed. No increase in the value metal content was observed, however, there was an increase in the dissolved calcium content.

It can be seen from the above tabulated figures of value metals that leaching a sulphidic ore body in-situ with an acetate containing solution in the presence of an oxidizing agent will provide significant extraction, even in a relatively short residence time in a single cycle of contact. It is to be noted on the other hand, that further leaching of value metals virtually ceased after the oxidant present in the solution has been consumed. It can also be concluded from the above tests that the sulphur combined with the value metals in the mineralized section as sulphides, is present in the solution as suspended elemental sulphur and not as sulphate. It is believed that due to the nature of flour of sulphur, a portion of the elemental sulphur produced by the leach reaction, may not have been removed from the drillhole when the solution was withdrawn.

The above example also demonstrates that dissolution of lead can be substantially terminated to end lead acetate formation when desired.

The process of in-situ leaching of sulphidic minerals in an ore body and the leaching of unconsolidated sulphidic minerals of the present invention have the additional advantages that it does not entail preconcentration of the minerals, which may require costly mining expenditures and equipment. The process does not create acid drainage problems and uses environmentally friendly and biodegradable reagents such as acetic acid and alkali and alkaline earth metal acetates.

The present process does not require the use of costly apparatus for extractive purposes, hence the residence time of the solution is predominantly influenced only by convenience and efficacy of extraction of value metals from the ore.

The present process can be utilized to reach, leach and thus recover value metals from sulphides which are either too widely disseminated or too fine-grained to be economically recovered by conventional mining steps.

Another advantage of the present process is that sulphate formation is substantially avoided, hence the solubilized lead will stay in solution and may be recovered by convenient known means. Furthermore, other value metals, such as zinc, copper, cerium, yttrium, gold, silver and platinum group metals under certain circumstances, which may also be present in the ore body accompanying the lead sulphide, may also be recovered without additional mining costs.

Yet another advantage of the instant process is that leaching of lead either in the in-situ leaching step or in leaching unconsolidated lead sulphide bearing minerals, may be terminated at short notice should the need arise, by cutting off the oxygen or oxidant supply, and may also be restarted at will if so desired, without any adverse effects. The leach reagents may thus be rendered harmless without any damage to the environment or additional expense.

Although the present invention has been described with reference to the preferred embodiments, it is to be understood that modifications and variations may be resorted to without departing from the spirit and scope of the invention, as those skilled in the art readily understand. Such modifications and variations are considered to be within the purview and scope of the invention and the appended claims.

We claim:

1. A process for obtaining a lead containing solution by in-situ leaching lead sulphide bearing minerals in an ore body, comprising the steps of:
   a) preparing an aqueous solution for solubilizing lead contained in lead sulphide bearing minerals, said aqueous solution containing acetic acid and acetates of at least one member selected from the group consisting of alkali metals and alkaline earth metals, and having a pH between 3.5 and 7;
   b) preparing an underground ore body containing lead sulphide bearing minerals by drilling passages into the ore body to access fissures in said ore body;
   c) injecting said aqueous solution prepared in step a) into the drilled passages thereby contacting and leaching said lead sulphide bearing minerals with said aqueous solution at ambient temperature and pressure, in the presence of an oxidant, said oxidant being present in an oxidation potential sufficient to oxidize sulphide in said ore body to elemental sulphur but insufficient to oxidize said sulphide to hexavalent sulphur, and maintaining contact of said aqueous solution within said ore body to solubilize the lead in said lead sulphide bearing minerals as lead acetate, thereby obtaining a lead acetate containing solution; and
   d) removing the resulting lead acetate containing solution from said ore body.

2. A process as claimed in claim 1, wherein said aqueous solution reacts with and is replenished by dissolving alkali metal and alkaline earth metal compounds present in said ore body, thereby increasing the porosity of said ore body and enhancing penetration of said aqueous solution.

3. A process as claimed in claim 1, wherein said aqueous solution has a pH between 4 and 6.5.

4. A process as claimed in claim 1, wherein said oxidant is selected from the group consisting of an oxygen containing gas, a water-soluble peroxide, a water-soluble permanganate and a water-soluble perchlorate.

5. A process as claimed in claim 4, wherein said oxidant is a water-soluble permanganate.

6. A process as claimed in claim 1, wherein said oxidant is an oxygen containing gas introduced into said drilled passages prior to injecting said aqueous solution.

7. A process as claimed in claim 1, wherein said ore body is located in sandstone.

8. A process as claimed in claim 1, wherein said lead in said lead sulphide bearing minerals in said ore body, is solubilized in the presence of a variable valency metal ion selected from the group consisting of copper, manganese, iron, chromium, cobalt and titanium.

9. A process as claimed in claim 1, wherein said lead sulphide bearing minerals in said ore body also contain other metal containing minerals, and said other metal is selected from the group consisting of zinc, tin, copper, cobalt, nickel, gold, silver and platinum group metals, which are also solubilized by said aqueous solution.

10. A process as claimed in claim 1, wherein lead is recovered from said lead acetate containing solution removed from said ore body, forming a lead barren solution containing acetic acid and acetates of alkali metals and alkaline earth metals which is recycled for further solubilization of lead in said ore body.

11. A process as claimed in claim 1, wherein the concentration of acetic acid and acetates of alkali metals and alkaline earth metals in the aqueous solution for solubilizing lead in the presence of an oxidant, is between 5 and 50 wt. %.

12. A process for obtaining a lead containing solution by in-situ leaching unconsolidated mineral particles bearing lead sulphide, comprising the steps of:
   a) preparing an aqueous solution for solubilizing lead contained in lead sulphide bearing minerals, said aqueous solution containing acetic acid and acetates of at least one member selected from the group consisting of alkali metals and alkaline earth metals, and having a pH between 3.5 and 7;
   b) forming a bed of loosely packed unconsolidated mineral particles bearing lead sulphide, said bed being located in a pile or in a vat open to the atmosphere, said bed of loosely packed unconsolidated mineral particles bearing lead sulphide being permeable to a leach solution by percolation;
   c) injecting into said bed of loosely packed unconsolidated mineral particles bearing lead sulphide said aqueous solution prepared in step a) and percolating said aqueous solution within said bed, thereby leaching said lead sulphide bearing unconsolidated mineral particles with said aqueous solution at ambient temperature and ambient pressure, in the presence of an oxidant, said oxidant being present in an oxidation potential sufficient to oxidize sulphide in said bed of loosely packed unconsolidated sulphide bearing mineral particles to elemental sulphur but insufficient to oxidize said sulphide to hexavalent sulphur, and maintaining contact of said aqueous solution with said bed of loosely packed unconsolidated mineral particles bearing lead sulphide to solubilize the lead in said lead sulphide as lead acetate, thereby obtaining a lead acetate containing solution; and
   d) removing the resulting lead acetate containing solution from said bed of loosely packed unconsolidated mineral particles.

13. A process as claimed in claim 12, wherein said unconsolidated mineral particles bearing lead sulphide are selected from the group consisting of crushed untreated rock bearing lead sulphide, agglomerated sulphidic mineral concentrate, agglomerated mill tailings containing lead sulphide, unagglomerated mill tailings containing lead sulphide and lead sulphide containing waste material.

14. A process as claimed in claim 13, wherein said unconsolidated mineral particles bearing lead sulphide have been agglomerated with additives at ambient temperatures prior to forming said bed of said loosely packed unconsolidated mineral particles in said pile or said vat.

15. A process as claimed in claim 14, wherein said additives contain a water-soluble acetate.

16. A process as claimed in claim 12, wherein said aqueous solution has a pH between 4 and 6.5.

17. A process as claimed in claim 12, wherein said oxidant is selected from the group consisting of an oxygen containing gas, a water-soluble peroxide, a water-soluble permanganate and a water-soluble perchlorate.

18. A process as claimed in claim 17, wherein said oxidant is a water-soluble permanganate.

19. A process as claimed in claim 12, wherein said lead in said unconsolidated mineral particles bearing lead sulphide is solubilized in the presence of a variable valency metal ion selected from the group consisting of copper, manganese, iron, chromium, cobalt and titanium.

20. A process as claimed in claim 12, wherein said aqueous solution reacts with and is replenished by dissolving alkali metal and alkaline earth metal compounds present in said unconsolidated mineral particles bearing lead sulphide, thereby increasing the porosity of said unconsolidated mineral particles and enhancing penetration of said aqueous solution.

21. A process as claimed in claim 12, wherein said unconsolidated mineral particles bearing lead sulphide also contain compounds of other metals, and said other metal is selected from the group consisting of zinc, tin, copper, cobalt, nickel, gold, silver and platinum group metals, which are also solubilized by said aqueous solution.

22. A process as claimed in claim 12, wherein lead is recovered from said lead acetate containing solution removed from said bed of loosely packed unconsolidated mineral particles forming a lead barren solution containing acetic acid and acetates of alkali metals and alkaline earth metals which is recycled for further solubilization of lead in the unconsolidated mineral particles bearing lead sulphide.

23. A process as claimed in claim 12, wherein the concentration of acetic acid and acetates of alkali metals and alkaline earth metals in the aqueous solution for solubilizing lead in the presence of an oxidant, is between 5 and 50 wt. %.

* * * * *